United States Patent
Allam (10) Patent No.: US 7,754,067 B2
(45) Date of Patent: Jul. 13, 2010

(54) PROCESS AND APPARATUS FOR UPGRADING HEAVY HYDROCARBONS USING SUPERCRITICAL WATER

(75) Inventor: Rodney John Allam, Chippenham (GB)

(73) Assignee: Air Products and Chemicals, Inc., Allentown, PA (US)

( * ) Notice: Subject to any disclaimer, the term of this patent is extended or adjusted under 35 U.S.C. 154(b) by 329 days.

(21) Appl. No.: 12/033,933

(22) Filed: Feb. 20, 2008

(65) Prior Publication Data

US 2009/0206006 A1    Aug. 20, 2009

(51) Int. Cl.
*C10G 49/18*    (2006.01)
*C10G 47/00*    (2006.01)

(52) U.S. Cl. .................. 208/130; 208/435; 208/428; 208/107

(58) Field of Classification Search .................. 208/107
See application file for complete search history.

(56) References Cited

U.S. PATENT DOCUMENTS

| | | | |
|---|---|---|---|
| 1,956,603 A | 5/1934 | White | |
| 3,850,738 A | 11/1974 | Stewart, Jr. et al | |
| 3,989,618 A | 11/1976 | McCollum et al. | |
| 4,421,631 A | 12/1983 | Ampaya et al. | |
| 4,485,003 A | 11/1984 | Coenen et al. | |
| 4,818,370 A | 4/1989 | Gregoli et al. | |
| 4,840,725 A | 6/1989 | Paspek | |
| 2003/0168381 A1 * | 9/2003 | Hokari et al. | ................ 208/106 |
| 2005/0040081 A1 | 2/2005 | Takahashi et al. | |
| 2007/0144941 A1 | 6/2007 | Hokari et al. | |

FOREIGN PATENT DOCUMENTS

| CA | 2 667 261 A1 | 5/2008 |
|---|---|---|
| WO | 2008/055171 A3 | 5/2008 |

OTHER PUBLICATIONS

Vostrikov, et al; "Combustion of Coal Particles in H2O/O2 Supercritical Fluid," American Chemical Society, May 27, 2007; pp. A-G.
Vostrikov, et al, "Kinetics of Coal Conversion in Supercritical Water," American Chemical Society, Jul. 19, 2007; pp. A-F.

* cited by examiner

*Primary Examiner*—Glenn A Caldarola
*Assistant Examiner*—Michelle L Stein
(74) *Attorney, Agent, or Firm*—Willard Jones, II (57) ABSTRACT

Heavy hydrocarbons are upgraded more efficiently to lighter, more valuable, hydrocarbons with lower amounts of solid carbonaceous by-products in supercritical water using two heating stages, the first stage at a temperature up to about 775K and the second stage at a temperature from about 870K to about 1075K. The temperature is preferably raised from the first temperature to the second temperature by internal combustion using oxygen.

15 Claims, 2 Drawing Sheets

PROCESS AND APPARATUS FOR UPGRADING HEAVY HYDROCARBONS USING SUPERCRITICAL WATER

BACKGROUND OF THE INVENTION

The present invention relates to upgrading low value, heavy hydrocarbons, i.e. converting heavy hydrocarbons into more valuable, lower molecular weight (or "lighter") hydrocarbons, using supercritical water ("SCW").

Heavy hydrocarbons may be upgraded in partial oxidation processes. "Partial oxidation" refers generally to the combustion of a fuel using a sub-stoichiometric amount of oxygen ("$O_2$") to produce a "synthesis gas" (or "syngas") comprising carbon monoxide and hydrogen. The synthesis gas (which also contains methane and carbon dioxide) can then be converted into light hydrocarbons in, for example, a Fisher-Tropsch process.

Broadly speaking, there are two types of partial oxidation process, i.e. thermal partial oxidation ("TPOX") and catalytic partial oxidation ("CPOX"). Current TPOX processes generally require high temperatures, typically above 1600K, and high pressures, typically from 40 to 70 bar, and efficiency is rather low (e.g. 70% dry gas efficiency for a Texaco/GE quench gasifier and 80% for a Shell dry feed gasifier). Accordingly, there is a need to develop an alternative process to the current TPOX process to improve the efficiency of upgrading heavy, low value, hydrocarbons.

Molecular modeling studies carried out under the direction of the Inventor predicted that partial oxidation of heavy hydrocarbons in SCW with pure oxygen gas would be rapid at lower temperatures, e.g. from 600K to 1000K, and pressures, e.g. 250 bar to 350 bar. Importantly, these studies predicted the same spectrum of products as produced in conventional TPOX reactions. Unexpectedly, experimental studies revealed that, in contrast to the results predicted by the molecular modeling studies, lower molecular weight hydrocarbon compounds are produced directly from reaction of heavy hydrocarbon feedstock in SCW.

SCW is already known to a certain extent for use in processes to convert hydrocarbon compounds. For example, it has been reported ("Pyrolysis of eicosane in supercritical water"; Vostrikov et al; *Russian Chemical Bulletin, Int.* Ed.; Vol. 50, No. 8, pp. 1478-1480, August 2001) that eicosane can be converted into a mixture of methane, carbon monoxide, carbon dioxide and hydrogen by heating in SCW at 30 MPa (300 bar) and at a temperature from 450° C. to 750° C. (~723K to ~1023K). It has also been reported ("Naphthalene oxidation in supercritical water"; Vostrikov et al; *Russian Chemical Bulletin, Int.* Ed.; Vol. 50, No. 8, pp. 1481-1484, August 2001) that naphthalene can be converted into a mixture of benzene, toluene, methane, hydrogen, soot and carbon oxides by heating in SCW at 30 MPa (300 bar) and at temperature from 660° C. to 750° C. (~935K to ~1025K).

U.S. Pat. No. 4,421,631 (Ampaya et al; published in 1983) discloses a process for upgrading a heavy hydrocarbon material, e.g. a petroleum residual, using a molten salt, e.g. alkali metal carbonate(s). Heat for the process is provided by combustion of carbonaceous material, produced as a by product of the upgrading process and entrained in the flow of molten salt, using oxygen.

Processes to upgrade low value, heavy hydrocarbons into more valuable, lighter hydrocarbons using water under supercritical conditions are also known.

U.S. Pat. No. 1,956,603 (White; published in 1934) discloses "aquolysis" processes for converting heavy petroleum hydrocarbons including tars, tarry oils and shale oil into liquids of lower boiling points by heating the heavy hydrocarbons in the form of an emulsion with water at a temperature from 900° F. to 1300° F. (~755K to ~980K) and a pressure from below 100 bar to above 1000 bar. It is disclosed that supercritical pressures are preferred.

U.S. Pat. No. 3,989,618 (McCollum et al; published in 1976) discloses a process for upgrading hydrocarbons including heavy materials such as gas oil, residual oils, tar sands oil, oil shale kerogen extracts and liquefied coal products by contacting the hydrocarbons with a water-containing fluid at a temperature in the range of 600° F. to 900° F. (~590K to ~755K) and, preferably, at about 705° F. (647K) which is the critical temperature of water. U.S. Pat. No. 3,989,618 exemplifies heating tar sands oil in water (1:3) at a temperature of 752° F. (~675K) and at a reaction pressure of 4350 psig (~300 bar) for 3 hours in an autoclave. The tar sands oil was cracked to produce hydrogen, carbon dioxide and methane gases (11.2 wt % total), light ends (75.2 wt %), heavy ends (8.6 wt %) and a solid residue (5.0 wt %). U.S. Pat. No. 3,989,618 also exemplifies semi-continuous flow processing of tar sands oil in water (1:3) at 752° F. (~675K) and 4100 psig (~285 bar) in an externally-heated pipe reactor having a reaction volume of about 6 milliliters.

U.S. Pat. No. 4,840,725 (Paspek; published in 1989) discloses a process for converting heavy hydrocarbon oil feedstocks to fuel range liquids. The process involves contacting the heavy hydrocarbons with water (typically, 2:1 to 1:1) at a temperature from 600° F. to 875° F. (~590K to ~740K) at a pressure preferably from 4000 psi to 6000 psi (~275 bar to ~415 bar). It is disclosed that reaction times are generally short (from a few seconds up to about 6 hours) and that the fuel range liquids produced have increased amounts of high value aromatic carbons. U.S. Pat. No. 4,840,725 exemplifies converting shale oil using a 400 ml vertical tube reactor operating at 825° F. (~715K) and 4900 psi (~340 bar). U.S. Pat. No. 4,840,725 acknowledges that coke is produced as a by product of the reaction of feedstock with SCW and indicates that the reaction temperature should not exceed 875° F. (~740K) in order to minimize formation of this by product.

U.S. Pat. No. 4,818,370 (Gregoli et al; published in 1989) discloses processes for upgrading heavy hydrocarbons using brine under supercritical conditions. It is disclosed that hydrocarbon deposits may be upgraded in situ in subterranean reservoirs and that heat for these processes may be provided by pumping oxygen into the reservoir to combust a portion of the deposits. Temperatures in the combustion zone are allowed to reach ~478K to ~1030K at which point the combustion is stopped to allow heat to soak through the reservoir and for the upgrading reactions to occur.

US 2005/0040081 (Takahashi et al; published in 2005) discloses a process for upgrading heavy hydrocarbon oil using SCW at a temperature up to ~725K to produce lighter hydrocarbons which are combusted in a gas turbine to generate power. Any unreacted hydrocarbon residue is combusted to produce heat which is used, together with heat produced in the gas turbine, to heat water for the process. Further heat for the cracking process is provided externally using a heater. However, it is disclosed that the amount of heat supplied externally may be reduced by reacting a portion of the heavy hydrocarbon with an oxidant.

US 2007/0144941 (Hokari et al; published in June 2007) discloses a process for upgrading heavy hydrocarbon oil using SCW in the presence of an oxidant, e.g. oxygen, to remove vanadium from the heavy oil to ensure that vanadium is not present in the lighter hydrocarbon products.

There is a need for new processes for upgrading heavy hydrocarbon feedstock. New direct conversion processes should be more efficient than existing processes, for example by increasing the overall yield of the lighter hydrocarbons and by improving the spectrum and distribution of hydrocarbons produced. In addition, new processes should improve control of the formation of unwanted solid carbonaceous by-products such as coke and soot.

BRIEF SUMMARY OF THE INVENTION

According to a first aspect of the present invention, there is provided a process for converting heavy hydrocarbon feedstock into conversion products comprising lower molecular weight hydrocarbon compounds, said process comprising:

mixing heavy hydrocarbon feedstock and supercritical water ("SCW") to form a fluid reaction mixture at a first temperature up to about 775K;

heating said fluid reaction mixture to a second temperature from about 870K to about 1075K;

maintaining said fluid reaction mixture at said second temperature for sufficient time to form a resultant fluid mixture containing said conversion products.

In the context of the present invention, "heavy hydrocarbon feedstock" is hydrocarbonaceous materials typically having an initial boiling point ("IBP") of at least 300° C. (~575K), preferably at least 400° C. (~675K), and most preferably at least 500° C. (~775K). The feedstock is usually characterized by the presence of polycyclic aromatic hydrocarbons such as asphaltenes. The feedstock may be heavy residual by-products of oil refining or may be naturally occurring materials. Examples of suitable heavy hydrocarbons for use with the present invention include bitumen (or asphalt); pitch; tar; tar sand oil; vacuum residue; shale oil; kerogen; and coal tar. The invention has particular application to the conversion of bitumen, pitch or tar.

"Lower molecular weight hydrocarbon compounds" are hydrocarbon compounds having a lower molecular weight than the heavy hydrocarbon feedstock. The lower molecular weight hydrocarbon products have lower viscosities and lower boiling points than the heavy hydrocarbon feedstock.

The lower molecular weight hydrocarbon compounds are typically produced in three fractions, i.e. a gas fraction; a liquid hydrocarbon fraction having a density less than water; and a hydrocarbon fraction having a density greater than water. The gas fraction usually comprises $C_1$-$C_4$ alkanes such as methane, ethane and propane; and $C_2$-$C_4$ alkenes such as ethene and propene. The gas fraction typically also includes hydrogen; carbon monoxide; and carbon dioxide. The liquid hydrocarbon fraction usually comprises a mixture of benzene; toluene; and xylenes ("BTX"). The denser hydrocarbon fraction usually comprises the heavier, e.g. $C_8$-$C_{20}$ hydrocarbon fragments. Solid carbonaceous materials such as coke, soot and/or carbon are also produced.

"SCW" is water which is at a temperature and pressure exceeding its critical temperature and critical pressure. The critical temperature of water is the temperature above which water cannot be liquefied by an increase in pressure, i.e. 374° C. (647K). The critical pressure of water is the pressure of water at its critical temperature, i.e. 22.1 MPa (221 bar).

According to a second aspect of the present invention, there is provided a reactor system for converting heavy hydrocarbon feedstock into conversion products comprising lower molecular weight hydrocarbon compounds, said reactor system comprising:

a source of SCW;

a mixing zone for mixing heavy hydrocarbon feedstock and SCW to form a fluid reaction mixture at a first temperature up to about 775K;

a feeding system for feeding SCW from said source and feedstock into said mixing zone;

a heating system for heating said fluid reaction mixture from said first temperature to a second temperature from about 870K to about 1075K;

a higher temperature reaction zone for maintaining said fluid reaction mixture at said second temperature for sufficient time to form a resultant fluid mixture containing said conversion products, said reaction zone being in fluid flow communication with said mixing zone; and an outlet system for removing said resultant fluid mixture.

DETAILED DESCRIPTION OF THE INVENTION

The process of the present invention comprises mixing SCW and, typically pre-heated, feedstock to form a fluid reaction mixture at a first temperature up to about 775K. The fluid reaction mixture is thought to be a single phase, homogeneous mixture. The fluid reaction mixture is heated to a second temperature from about 870K to about 1075K and maintained at said second temperature for sufficient time to produce a resultant fluid mixture containing said lower molecular weight hydrocarbon compounds and, typically, solid carbonaceous material. Solid carbonaceous material may have been deposited on the surface of internal components of a reactor in which the process takes place.

The feedstock is usually warmed to a suitable temperature to reduce viscosity so that the feedstock can be pumped to the required pressure. The Inventor has observed, however, that bitumen cakes (i.e. viscosity actually increases due to polymerization) at temperatures above about 725K. Thus, heavy hydrocarbon feedstock is usually pre-heated to a temperature below the upper solidification temperature of the feedstock. The upper solidification temperature varies between different feedstocks and the temperature of the pre-heated feedstock will depend on the behavior of the actual feedstock used. However, feedstock is preferably at a temperature of no more than 725K, e.g. from about 647K to about 725K. Such a temperature is particularly suitable if the feedstock is bitumen.

The temperature of the SCW is typically selected to ensure that the temperature of the fluid reaction mixture is from about 650K to about 775K after the feedstock is mixed with the SCW. Before mixing with the feedstock, the SCW is usually at a temperature from about 650K to about 900K.

Provided that the pressure of the process is over the critical pressure of water (about 22.1 MPa or 221 bar), the pressure is not critical to the invention. The pressure may be up to about 100 MPa (1000 bar), e.g. up to about 50 MPa (500 bar). The pressure is preferably from about 25 MPa to about 40 MPa (250 bar to 400 bar), e.g. about 30 MPa (300 bar), as such pressures ensure the presence of supercritical conditions for the mixture of water and hydrocarbons in the system.

The mass ratio of feedstock to water is typically from about 2:1 to about 1:10, usually from about 3:2 to about 1:6 and, typically, from about 1:1 to 1:2.

Experimental investigations have determined that a preferred value for the first temperature is typically from the supercritical temperature of water, i.e. about 647K, to about 775K, and preferably from about 650K to about 755K, e.g. about 675K to about 725K, and that the second temperature is preferably from about 925K to about 1050K and more preferably from about 950K to about 1025K.

Without wishing to be bound by any particular theory, the two operational ranges of temperature are chosen corresponding to two possible mechanisms of reaction. The first temperature range is typically about 647K to about 775K. In this range, the heavy hydrocarbon feedstock forms primarily a single phase, homogenous mixture with SCW with a minor amount of undissolved residue having a high carbon to hydrogen ratio which also contains the ash and at least the bulk of the inorganic content of the feed. Feedstock molecules are understood to break down under these conditions to produce lighter hydrocarbon fragments, having a higher hydrogen to carbon ratio than the feedstock, and leaving a higher carbon to hydrogen ratio fraction as a non-reactive insoluble residue. At the first temperature, the water is acting as a solvent and as a heat carrier but does not actually react with the feedstock itself.

Preliminary investigations regarding the first stage used experiments involving injecting pre-heated tar (vacuum residue having composition $C_1H_{1.43}S_{0.015}$) into SCW within a horizontal reactor with a constant wall temperature of about 690K at a pressure of about 300 bar. The investigations revealed that the tar dissolved in the SCW by diffusion alone until an equilibrium point was reached in about 75 minutes. About 76% of the total tar mass was recovered as useful lighter hydrocarbon products in three distinct fractions, leaving about 24% as coke having a carbon to hydrogen ratio of about 1:1.13. The three fractions were:

(a) a gas fraction (29.9% of the total tar mass) having a composition as follows:
$CH_4$ 47.6% (molar);
$C_2H_6$ 29%;
$C_3H_6$ 13.3%;
$C_2H_6$ 3.4%;
$C_3H_8$ 6.0%; and
$C_{3+}$ 0.7%,
(b) a hydrocarbon fraction having a density less than water (33.7% of the total tar mass) with about half of the fraction having a boiling point of less than 373K; and
(c) a "heavy" hydrocarbon fraction having a density greater than water (heating this fraction to 723K in a vacuum loses 22.7% of mass evaporated; extraction with toluene left a final residue of 24% of the total tar mass).

Analysis of the total liquid fraction [(b) plus (c)] showed that the total mass fraction of hydrocarbon molecules, with carbon atom numbers of 12 or less, was 36% while the total mass fraction with a boiling temperature of less than 573K was 42%.

The Inventor observed that sulfur present in the tar is released partly as $H_2S$ and partly as COS and a good deal is retained in the residual coke. The degree of release of sulfur as $H_2S$ and COS was seen to increase as the temperature was raised. During a test at 300 bar in a horizontal reactor at 690K for duration of 2 hours and with no mixing except diffusion, the total mass proportion of sulfur in the tar feed released as $H_2S$ was 27.3%. This proportion will be maintained for lower residence times with increased mixing of the tar and supercritical water.

Rapid mixing of the feedstock and the SCW is, however, preferred. The time taken to reach mixing equilibrium is drastically reduced by agitating the mixture by creating flow turbulence. Flow turbulence may be created by a device such as a static mixer or otherwise by an arrangement of concentric shells defining a convoluted path or "multi-pass" arrangement. The use of a high flow velocity also creates flow turbulence. The time required to form the fluid reaction mixture can be reduced by increasing the temperature of the solution up to about 775K although it is important to bear in mind the upper solidification temperature of the feedstock. The feedstock is preferably atomized, e.g. using a suitable high intensity nozzle mixer, to increase interfacial surface area between feedstock and SCW.

In preferred embodiments, the period of time over which the feedstock is mixed with SCW is typically from about 1 second to about 10 minutes. This period is preferably less than 5 minutes and, more preferably, from about 5 seconds to about 60 seconds.

The second mechanism of reaction occurs in the range of the second temperature, i.e. from about 870K to about 1075K. The Inventor believes that, at the second temperature, water reacts with hydrocarbon molecules in accordance with the following equation:

$$(n+4)C + 2nH_2O \rightarrow 4CH_n + nCO_2$$

(where the feed C refers to carbon in high molecular weight hydrocarbons) thereby hydrogenating feedstock fragments and increasing the yield of lighter, more valuable, hydrocarbon products and improving the distribution of products. The rate of conversion is determined by the kinetics of essentially gas phase reactions. The hydrogenation reactions are understood to be substantially isothermal. At this stage, not only is SCW acting as a solvent and a heat carrier, it is also acting as a hydrogenator.

Once the temperature rise has occurred, it is necessary to maintain the fluid reaction mixture at the second temperature for sufficient time to allow not only the free-radical reactions but also the hydrogenation reactions to occur, which leads to formation of valuable products with higher hydrogen to carbon ratio than the feedstock. The period of time over which the fluid reaction mixture is maintained at the second temperature is typically from about 1 second to about 10 minutes. In preferred embodiments, this period is less than 5 minutes and, preferably, from about 5 seconds to about 60 seconds.

The period to form the fluid reaction mixture is, typically, longer than the period at which the mixture is maintained at the second temperature. Ultimately, the difference in the two periods depends on the particular conversion in question. However, a ratio of the periods from about 2:1 to about 4:1 may be appropriate.

The Inventor has observed that reaction temperatures between the upper limit of the first temperature range and the lower limit of the second temperature range (e.g. from about 775K to about 870K) unfortunately favor bitumen caking and formation of solid carbonaceous material such as hard coke and fluffy carbon soot rather than the formation of the desired conversion products. Neither of these effects is desirable as they both lead to loss of recovery and increased risk of blockage of the reactor and associated apparatus, necessitating the reactor being taken off-line for periodic cleaning. Therefore, in order to reduce the number of times the reactor needs to be cleaned, the solution is preferably heated from the first temperature to the second temperature as fast as possible, i.e. in as short a time as possible, to avoid undue formation of unwanted solid carbonaceous deposits. In preferred embodiments, the fluid reaction mixture is heated from the first temperature to the second temperature in no more than 20 seconds, preferably in no more than 10 seconds, more preferably in no more than 5 seconds and most preferably in less than 1 second.

The soot and coke formation occurs by dehydrogenation of the feedstock down to an approximate formula $CH_{0.5}$. The dissociation of water molecules has been shown to become significant at a temperature of over 925K. It appears that above this temperature the soot potential radicals are oxidized in reactions such as:

$$2CH_{0.5} + 2H_2O \rightarrow 2CO + 2H_2 + H$$

Thus, one molecule of water should be required for each mol of $CH_{0.5}$ radical. It has also been found, experimentally, that the rate of this reaction is greater than the rate of formation of $CH_{0.5}$ and free C radicals at these temperatures, so that the soot suppression at above 925K takes place with less than an overall 2:1 water ratio.

At least a portion of the heat required to increase the temperature of the solution from the first temperature to the second temperature may be provided externally, e.g. from a furnace or by electrical heating elements. However, in preferred embodiments, at least a portion and, preferably all, of the heat required to heat the fluid reaction mixture from the first temperature to the second temperature is provided internally.

The fluid reaction mixture will typically comprise combustible components including hydrocarbonaceous components (e.g. selected from feedstock and/or lower molecular weight hydrocarbon compounds and fragments) and carbonaceous components (e.g. selected from coke, soot and/or carbon). The addition of gaseous oxygen ($O_2$) to the fluid reaction mixture results in combustion of a portion of these combustible components.

The portion of the combustible components that react with oxygen to increase the temperature from the first temperature to the second temperature usually equates to no more than 30 wt %, preferably no more than 20 wt %, e.g. from about 10 wt % to about 20 wt % of the feedstock, particularly in embodiments in which the feedstock is bitumen.

An oxygen-containing gas such as air may be introduced to combust the portion of combustible components. However, an oxygen-containing gas containing at least 50%, preferably at least 90%, and more preferably at least 95%, oxygen (with the remainder being an inert carrier gas such as nitrogen) is typically used. The use of "pure" oxygen, i.e. at least 99% oxygen, is preferred.

The oxygen-containing gas is preferably pre-heated to a suitable temperature which is typically from about 550K to about 700K, preferably from about 600K to about 650K, e.g. about 625K. The oxygen-containing gas will be introduced to the fluid reaction mixture at the operating pressure of the process.

The temperature of the second stage of the reactor is carefully controlled by the amount of oxygen-containing gas added to the fluid reaction mixture. The amount of oxygen is a control variable for the process and is defined by the heat balance. In this connection, it is well within the ability of the skilled person to calculate the required amounts of oxygen necessary to control the temperature of the second stage as required based on the mass flows rates of SCW and feedstock (hence, the composition of the fluid reaction mixture), the required mixing temperature and the temperature of the oxygen.

The upper and lower limits of the amount of oxygen used may be defined empirically based on the highest and lowest hydrocarbon to water mass ratios and the highest and lowest temperature rises from the first temperature to the second temperature. For example, an appropriate total amount of oxygen gas for a process converting bitumen at a mass ratio with water of 1:1 to 1:2 with a temperature rise from the first temperature to the second temperature from about 95K to about 428K is typically about 15 wt % to about 60 wt %. These figures may, of course, refer to the total amount of pure oxygen or the total amount of oxygen fed as a component in an oxygen-containing gas.

The Inventor has observed that the exothermic reaction causes an extremely rapid temperature rise. The presence of water moderates the temperature rise, and the very rapid reaction, which typically takes place in well under 1 second, does not lead to any significant soot formation.

An important feature of the stage of the process at the second temperature is the hydrocracking reaction with hydrogen derived from reaction between water molecules and the hydrocarbon material. This reaction may be improved by feeding hydrogen gas to the fluid reaction mixture at the second temperature to assist with the hydrogenation of the hydrocarbon material.

The hydrogen gas may come from an external source. Alternatively, the hydrogen could be produced by gasifying residual hydrocarbon material or by partial oxidation of coke, e.g. coke produced in the process. If the residual bitumen is gasified using pure gaseous oxygen in a conventional gasifier with carbon dioxide capture producing hydrogen which is then used to hydrogenate the fluid reaction mixture, the nett coke production may be dramatically reduced and both the yield and hydrogen to carbon ratio of the product slate may be improved.

The process is carried out in a reactor system. A suitable reactor system is a batch reactor such as an autoclave. However, in preferred embodiments, the process is carried out in a continuous flow reactor. The process preferably has a total residence time within a continuous flow reactor from about 2 seconds to about 20 minutes, e.g. from about 5 seconds to about 10 minutes, preferably about 10 seconds to about 5 minutes.

In embodiments where the reactor system has a mixing zone, the residence time in the mixing zone may be from about 1 second to 10 minutes, e.g. from about 5 seconds to about 60 seconds and, preferably about 30 seconds. In embodiments where the reactor system has a higher temperature reaction zone, the residence time in the reaction zone may be from about 1 second to about 10 minutes, e.g. from about 5 seconds to about 60 seconds and, preferably about 30 seconds.

The reactor system will usually be operated in a discontinuous or cyclic manner comprising an "on-line" phase (when feedstock is fed to the reactor system and converted into the conversion products), followed by an "off-line" phase in which only SCW and an oxygen-containing gas enter the reactor system to burn off solid carbonaceous deposits.

The reactor system typically operates in the "on-line" phase until the extent of the deposition of solid carbonaceous material is such that the reactor system needs to be cleaned. The period of the "on-line" phase is highly variable and depends on several factors such as the composition of the feedstock and the material from which the internal components of the reactor (e.g. those components in contact with the fluid reaction mixture) are made. The period may be from as little as about 30 minutes to as much as about 1 week or more.

The reactor system typically operates in the "off-line" phase until the reactor system has been cleaned of the deposits of solid carbonaceous material. The period of the "off-line" phase is highly variable and depends on several factors such as the extent of the deposition and the material of the internal components. However, the "off-line" phase usually lasts from about 5 minutes to about 1 hour.

The resultant fluid mixture may be supercritical or subcritical due to the production of gaseous conversion products. The resultant fluid mixture usually comprises particles of solid material such as coke, soot and ash, entrained within the flow of the fluid. These particles are preferably separated from the fluid. A suitable separator is a hydrocyclone device, e.g. a Norway-type entrainment separator, which may be located in the base of the higher temperature reaction zone of the reactor system.

The resultant fluid mixture, typically with the solid particles removed, is usually cooled to near ambient temperature (such as from about 5° C. to about 65° C., e.g. about 20° C. to about 55° C. or about 35° C. to about 50° C.) and the pressure reduced to allow liquid and vapor phases to separate. The final pressure is usually chosen to facilitate the optimum economics for separation of lower molecular weight hydrocarbon compounds, hydrogen, methane, etc. from the water phase. An appropriate final pressure may, for example, be from about 10 bar to about 100 bar, perhaps about 40 bar to about 60 bar, e.g. about 50 bar.

The water phase is usually recycled back to the process, typically with fresh make-up water.

Water, pressurized to the operating pressure of the process, may be heated by indirect heat exchange against the resultant fluid mixture or a fluid mixture derived therefrom, e.g. following removal of the entrained solid materials, to produce the SCW. However, the heat generated in the process is typically more than enough to produce the SCW. Accordingly, the process may comprise a steam heating cycle to provide heat balance in which water is heated by indirect heat exchange against the resultant fluid mixture, preferably following removal of said entrained solid materials to produce steam. In these embodiments, at least a portion of the excess heat is used to heat water at a pressure from about 100 bar to about 200 bar, e.g. 150 bar, to produce superheated steam at a temperature of about 750K to about 850K, e.g. about 793K.

At least a portion of the steam may be used to pre-heat feedstock by indirect heat exchange. In embodiments in which oxygen is fed to the fluid reaction mixture to combust a portion of the combustible components of said fluid reaction mixture, at least a portion of the steam may be used to pre-heat an oxygen-containing gas by indirect heat exchange. At least a portion of the steam may be used to generate power in a steam turbine.

In preferred embodiments, a first portion of the steam is used to pre-heat feedstock; a second portion of the steam is used to pre-heat the oxygen-containing gas; and a third portion of the steam is used to generate power is a steam turbine. The resultant water streams may be combined and recycled to a condensate pump for re-pressurization.

The hydrogenation process may be catalyzed using either a homogeneous catalyst or a heterogeneous catalyst. Any suitable conventional catalysts may be used, including nickel-based catalysts. However, in preferred embodiments, the process is uncatalyzed which is advantageous since there is no catalyst to have to clean periodically or remove from the residual fluid mixture. The Inventor notes that bitumen often contains nickel and vanadium that may self-catalyze the hydrogenation reaction.

Limestone ($CaCO_3$), sodium carbonate ($Na_2CO_3$), or sodium hydroxide (NaOH) or mixtures thereof may be added to the feedstock to facilitate desulfurization of the heavy hydrocarbon feedstock.

The reactor system comprises:
a source of SCW;
a mixing zone for mixing heavy hydrocarbon feedstock and SCW to form a fluid reaction mixture at a first temperature up to about 775K;
a feeding system for feeding SCW from said source and feedstock into said mixing zone;
a heating system for heating said fluid reaction mixture from said first temperature to a second temperature from about 870K to about 1075K;
a higher temperature reaction zone for maintaining said fluid reaction mixture at said second temperature for sufficient time to form a resultant fluid mixture containing said conversion products, said reaction zone being in fluid flow communication with said mixing zone; and
an outlet system for removing said resultant fluid mixture.

The reactor system typically comprises a source of feedstock. In such embodiments, the feed system preferably feeds feedstock from the feedstock source to the mixing zone.

A preferred continuous flow reactor is a tubular device with a high length to diameter ratio. Such an aspect ratio reduces the capital cost of the reactor as the reactor can have a thinner reactor wall. In addition, such an aspect ratio not only increases the length of the internal flow path and but also the fluid velocities, thereby increasing fluid turbulence and promoting good mixing. An example of a suitable reactor might be a pipe reactor.

The feeding system preferably comprises an atomizer, such as a high intensity atomizing nozzle, for atomizing said feedstock at the point of mixing with the SCW. The use of an atomizer increases the interfacial surface area of the feedstock thereby facilitating formation of the fluid reaction mixture.

The reactor system usually comprises a device provided in the mixing zone to create flow turbulence. The turbulence created by such a device facilitates dissolution of the feedstock in the SCW and decreases the necessary residence time of the mixture in the mixing zone. The device may be a static mixer or a set of internal concentric flow separation shells. For example, two internal concentric shells would provide a "three pass" arrangement and, with a constant area in each pass, would give three times the flow velocity with the same residence time in a reactor of a given volume. Such an arrangement reduces the wall temperature gradient and increases turbulence in the mixing zone of the reactor system.

The heating system may comprise an external heating system such as a furnace or an electrical heater. However, in preferred embodiments, the heating system is for providing heat internally within the reactor system.

The rise in temperature from the first temperature to the second temperature may be achieved by injecting an oxygen-containing gas into the fluid reaction mixture. In these embodiments, the heating system preferably comprises an oxygen inlet system for feeding oxygen-containing gas into said fluid reaction mixture.

The oxygen inlet system preferably provides a rapid, even reaction of oxygen with the fluid reaction mixture. Such a reaction may be achieved by the introduction of the oxygen-containing gas into the fluid reaction mixture in either a single stage or in a plurality of stages. Either way, the oxygen inlet system preferably provides uniform injection of the oxygen-containing gas into the fluid reaction mixture.

The oxygen inlet system preferably comprises a device for creating turbulence in a flow of fluid reaction mixture for facilitating mixing of oxygen with the fluid reaction mixture. In some embodiments, the oxygen-containing gas may be introduced to the fluid reaction mixture via an atomizing mixing nozzle. In other embodiments, the oxygen-containing gas may be introduced to the fluid reaction mixture from under the periphery of at least one umbrella (where high fluid velocities and turbulences exist) or stage-wise from under the peripheries of a plurality of umbrellas, typically arranged in series.

The oxygen-containing gas may come from any suitable location. For example, oxygen gas may be stored in a pressurized storage vessel and fed, with compression and/or pre-heating as required, to the oxygen inlet system of the reactor. Oxygen may be stored in a cryogenic storage tank as liquid oxygen; pumped in a LOX pump to the required pressure and heated in a suitable heat exchanger to produce oxygen gas at the required temperature and pressure which is then fed to the oxygen inlet system of the reactor system. However, in preferred embodiments, oxygen is produced on site in a cryogenic air distillation system, preferably operating a pumped LOX cycle. The LOX may taken from the cryogenic distillation system, pumped to the required pressure and heated to produce oxygen gas at the required temperature which is them fed to the oxygen inlet system of the reactor system.

The outlet system preferably comprises a separator for separating entrained solid materials from the resultant fluid mixture. A suitable separator is a hydrocyclone separator such as a Norway-type entrainment separator. The separator may be located outside the higher temperature reaction zone of the reactor system. However, in a preferred embodiment, the separator is located within the higher temperature reactor system, e.g. in the base thereof.

The Inventor has observed that there is a large amount of deposition of solid carbonaceous material in reactor systems having internal components made from stainless steel and he has concluded that the carbonaceous by-products are interacting with carbides in the steel. Therefore, in preferred embodiments, the internal components of the reactor system, i.e. those components in contact with the fluid reaction mixture, are made from a metal selected from the group consisting of titanium and copper and alloys thereof.

In embodiments where all fluids in the product heat exchange system are clean and free from solid particles, the heat exchangers can be fabricated as diffusion bonded multichannel blocks. Suitable heat exchangers would be those exchangers manufactured by Heatric Ltd (Poole, Dorset, UK) which are capable of achieving the required high temperature and pressure and can be fabricated in corrosion resistant materials.

Provision is preferably made for oxygen dissolved in SCW at temperatures above 700K to be pumped into both the mixing and higher temperature reaction zones of the reactor so that any deposits of coke and soot can be removed by oxidation to carbon dioxide and water. In preferred embodiments, oxygen is added to the SCW and then fed to the reactor.

Figure 1:
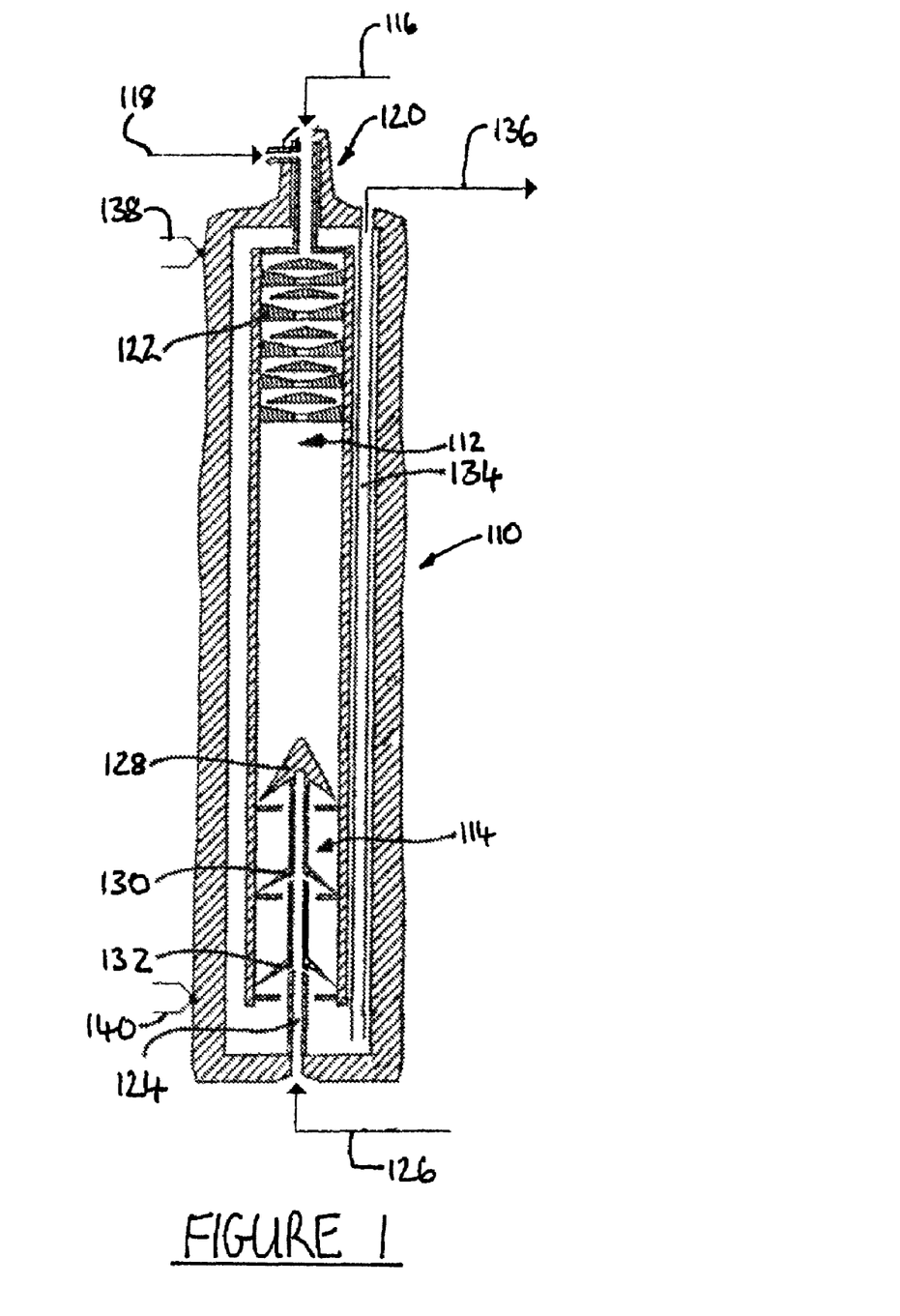
FIG. 1 is a cross sectional representation of a first embodiment of the reactor according to the present invention.

Referring to FIG. 1, tubular reactor 110 comprises a mixing zone 112 for dissolving heavy hydrocarbon feedstock in SCW to form a fluid reaction mixture at a temperature from 650K to 775K and a higher temperature reaction zone 114 for heating the fluid reaction mixture at a temperature of 870K to 1075K for sufficient time to produce the resultant fluid mixture. The reaction zone 114 is in fluid flow communication with the mixing zone 112.

A stream 116 of pre-heated heavy hydrocarbon feedstock and a stream 118 of SCW are combined in a feed system 120 and fed to the mixing zone 112. The mixing zone 112 comprises a static mixer 122 which mixes the feedstock with the SCW to produce the fluid reaction mixture which flows into the reaction zone 114 which comprises an oxygen inlet system 124 for feeding a stream 126 of oxygen into the fluid reaction mixture downstream of the mixing zone 112. The oxygen inlet system 124 comprises a series of three umbrellas 128,130,132 provided co-axially with the longitudinal axis of the reactor 110. Oxygen is injected into the reactor from under the umbrellas to combust a portion of the feedstock in the fluid reaction mixture, thereby raising the temperature of the fluid reaction mixture from the first temperature to the second temperature. The umbrellas cause turbulence in the flow of fluid reaction mixture through the second zone thereby facilitating mixing of the oxygen with the mixture from under the annular periphery of the umbrellas.

The reactor 110 has an outlet 134 for removing the resultant fluid mixture as stream 136. Temperature sensors 138 and 140 monitor the temperature within the reactor in both the mixing and higher temperature reaction zones.

Figure 2:
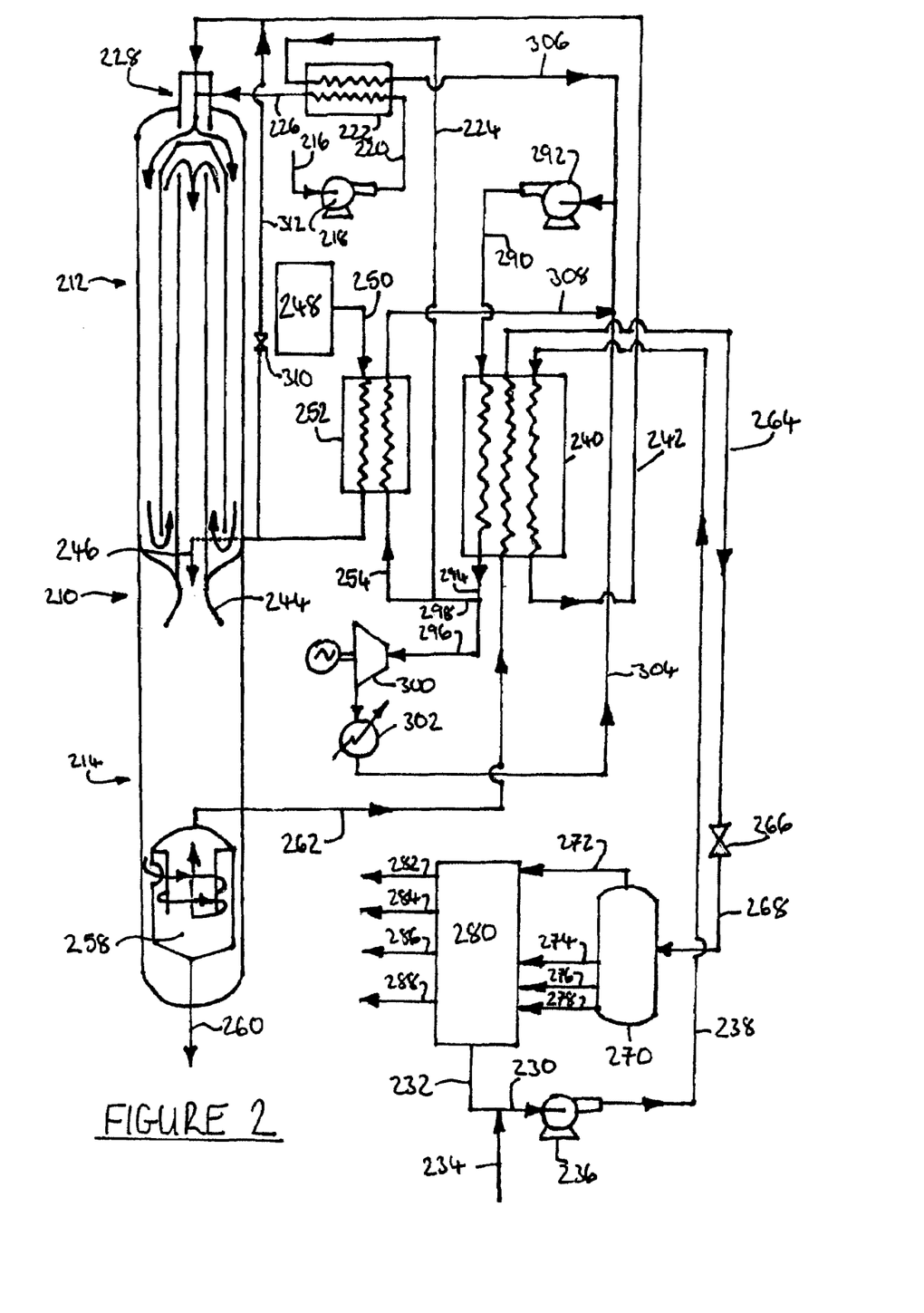
FIG. 2 is a schematic representation of an embodiment of the process according to the present invention involving a second embodiment of the reactor.

Referring to FIG. 2, reactor 210 has a mixing zone 212 and a higher temperature reaction zone 214. Feedstock, in this case bitumen, is warmed to reduce its viscosity and produce a stream 216 of warmed bitumen. Stream 216 is pumped to 300 bar in pump 218 to produce a stream 220 of pumped bitumen which is then pre-heated by indirect heat exchange in heat exchanger 222 against a condensing stream 224 of steam to produce a stream 226 of pressurized and heated bitumen. The bitumen is heated to a temperature from about 650K to about 725K to avoid caking. The actual temperature of the pre-heated bitumen depends in part on the upper solidification temperature of the bitumen. Stream 226 is then fed to the reactor 210 via feed system 228.

A water stream 230, comprising a stream 232 of recycled water and a stream 234 of make-up water, is pumped to 300 bar in pump 236 to produce a stream 238 of pumped water. Stream 238 is heated by indirect heat exchange in heat exchanger 240 to produce a stream 242 of SCW at a temperature such that, when mixed with stream 226 of heated bitumen to produce a fluid reaction mixture, the fluid reaction mixture is at a first temperature from about 647K to about 775K.

Feed system 228 comprises a high intensity atomizing nozzle (not shown) for atomizing the heated bitumen into the SCW to facilitate dissolution of the bitumen in the water. The mass ratio of bitumen to water is from about 1:1 to about 1:2.

The mixing zone 212 comprises two concentric shells defining a "three pass" arrangement of sections to increase the fluid velocity of the mixture through the mixing zone 212. The SCW and bitumen mixture passes through the three concentric sections, taking about 30 seconds which is sufficient time to allow the initial reduction in bitumen viscosity and the initial cracking of the complex molecular structure of the bitumen to take place. Most of the bitumen forms a single homogeneous phase with the SCW (the fluid reaction mixture) but a small fraction of a solid phase, composed of ash and a residue having high carbon to hydrogen ratio, is also formed.

The fluid reaction mixture leaves the mixing zone 212 via a mixing nozzle 244 where a stream 246 of pre-heated oxygen gas is introduced. In the exemplified embodiment, oxygen is separated from air in a cryogenic air separation plant 248 operating a pumped oxygen cycle producing a stream 250 of pressurized oxygen product at the operating pressure of the reactor 210 (about 300 bar) which is pre-heated to about 625K by indirect heat exchange in heat exchanger 252 against a condensing stream 254 of steam at 150 bar to produce the stream 246 of pre-heated oxygen gas.

The oxygen reacts rapidly, e.g. within 1 or 2 seconds, with combustible components of the fluid reaction mixture and raises the temperature of the solution to a second temperature from about 870K to about 1075K, e.g. about 975K. The quantity of oxygen is derived from the flow rates of the feedstock and the SCW and from the required first temperature. In the present example, the quantity of oxygen is about 30 wt % of that of the feedstock and the effect of which is that about 17 wt % of the hydrocarbon content of the fluid reaction mixture is combusted to raise the temperature. The oxygen reacts with this portion of the hydrocarbon content which is oxidized to carbon dioxide and water. The increase in temperature of the fluid reaction mixture causes free radical reactions to take place which allow water molecules to react with the feedstock molecules causing cracking and hydrogenation of the fragments with production of carbon dioxide. Residence time in the reaction zone is about 10 seconds, producing the resultant fluid mixture. The increase in temperature following oxygen injection will result in a three fold reduction in fluid density.

There is no need to use internal baffles in the reaction zone 214 of the reactor 210. Each zone will have approximately the same volume and the same fluid velocity. As an example, a reactor for 1 million tons (102000 tonnes) per year of bitumen with two sections, each section having an effective length of 15 meters, would have an internal diameter of about 1 meter.

The lower part of the reaction zone has an internal vortex Norway-type entrainment separator 258 which can separate any solid particles of coke, ash or carbon entrained with the resultant fluid mixture. The solid particles are removed as stream 260 and then further processed or disposed of. A stream 262 of resultant fluid mixture (with solid particles removed) is cooled in a heat exchanger 240 to produce a stream 264 at near ambient temperature, e.g. from about 35° C. to about 50° C. Stream 264, a two phase liquid/gas mixture, is reduced in pressure over valve 266 to produce a product stream 268 at about 50 bar which is then separated in a phase separator system 270 into a gaseous stream 272 (predominantly methane and some $C_2$ hydrocarbons, hydrogen and carbon monoxide) and some liquid phases 274, 276 and 278, i.e. hydrocarbons with a density lower than water (stream 274), water (stream 276) and hydrocarbons with a density higher than water (stream 278).

All these product streams can be treated in a conventional component separation train 280. A typical separation might be a methane stream 282; a fuel gas stream 284 which also contains all the $CO_2$ produced; a BTX (benzene/toluene/xylene) fraction 286; and a light and heavy oil fraction 288.

The heat released by cooling the product stream 262 in heat exchanger 240 is greater than that required for heating the 300 bar water feed stream 238 and, therefore, the process includes a steam heating cycle to provide heat balance. The excess heat is used to heat a stream 290 of water at a pressure of 150 bar delivered from a condensate pump 292 to produce a stream 294 of superheated steam at about 793K. Stream 294 is divided into two streams, 296 and 298. Stream 296 is used to generate power in a condensing steam turbine 300 and 302, producing recycle stream 304. Stream 298 is further divided to produce streams 224 and 254 which are used respectively to pre-heat the hydrocarbon feedstock in heat exchanger 222 and to pre-heat the oxygen in heat exchanger 252, thereby producing recycle streams 306 and 308. Recycle stream 304, 306 and 308 are recycled to the condensate pump 292.

When any part of the reactor system becomes blocked by deposits of solid coke or soot on internal surfaces, the deposits are burned away using a flow of oxygen dissolved in SCW. In this connection, the flow of stream 216 of bitumen feedstock is stopped and hydrocarbon compounds are purged from the system by a flow of SCW alone. Valve 310 is then opened and pre-heated oxygen gas is mixed with the SCW feed stream 242 via stream 312. The oxygen/water mixture burns off any coke or soot deposits and cleans the internal components of the reactor. Excessive temperatures are prevented by carefully controlling the amount of oxygen gas delivered to the reactor.

EXAMPLE

The performance of a bitumen conversion process according to the present invention using the laboratory scale reactor depicted in FIG. 1 has been measured over six test runs with varying ratios of water, bitumen and oxygen.

The reactor has an internal diameter of 28 mm, a higher temperature reaction zone length of 170 mm, and a three stage umbrella mixer and oxygen injection system. The laboratory reactor was fitted with external heating elements to ensure stable operation at the defined operating temperatures.

The feedstock considered was bitumen derived from oil vacuum distillation with a bottom column temperature of 870K. The formula of the bitumen used was $C_1H_{1.43}S_{0.015}$.

The reaction conditions for each run and the identity and proportions of the products are reproduced in Table 1.

TABLE 1

| | TEST | | | | | |
|---|---|---|---|---|---|---|
| | 1 | 2 | 3 | 4 | 5 | 6 |
| $T_M$(K) wall [~fluid] | 724 [~774] | 714 [~764] | 706 [~756] | 690 [~740] | 673 [~723] | 702 [~752] |
| $T_R$(K) wall [~fluid] | 844 [~894] | 826 [~876] | 875 [~925] | 879 [~929] | 875 [~925] | 963 [~1013] |
| P (bar) | 350 | 350 | 350 | 300 | 300 | 300 |
| $G_W$ (mg/s) | 150 | 50 | 100 | 100 | 100 | 100 |
| $G_T$ (mg/s) | 27 | 28 | 84 | 114 | 54 | 97 |
| $G_{O2}$ (mg/s) | 26 | 17 | 21 | 17 | 35 | 20 |
| $t_M$ (s) | 48 | 165 | 93 | 80 | 133 | 110 |
| $t_R$ (s) | 32 | 99 | 44 | 37 | 37 | 33 |
| $t_H$ (s) | 2.8 | 3.2 | 3.6 | 4.9 | 6.7 | 2.0 |
| $H_2$ (%) | 0.02 | 0.08 | 0.23 | 0.07 | 0.31 | 0.30 |
| $CH_4$ (%) | 5.9 | 12.0 | 29 | 26 | 28 | 35 |
| $C_2H_6$ (%) | 3.0 | 7.6 | 4.9 | 9.7 | 3.6 | 5.8 |
| $C_6H_6$ (%) | 7.1 | 15.9 | 23 | 22 | 25 | 24 |
| $C_7H_8$ (%) | 6.2 | 11.4 | 6.6 | 11.6 | 3.3 | 8.8 |
| $C_8H_{10}$ (%) | 3.6 | 9.0 | 1.54 | 3.3 | 0.45 | 2.8 |
| $C_9H_{12}$ (%) | 0.55 | 2.15 | 0.24 | 0.24 | 0.05 | 0.28 |
| $C_{10}H_{14}$ (%) | 0 | 0.51 | 0.03 | 0.24 | 0 | 0.13 |
| $C_{10}H_8$ (%) | 0.34 | 0.59 | 0.74 | 1.62 | 1.54 | 1.68 |
| CO (%) | 4.1 | 2.3 | 2.3 | 0.9 | 4.9 | 3.1 |
| $CO_2$ (%) | 50 | 28.4 | 17.6 | 3.4 | 33 | 4.4 |
| $(H_2O)_f$ (%) | 18 | 3 | −25 | 6 | −9 | 7.2 |

TABLE 1-continued

| | TEST | | | | | |
|---|---|---|---|---|---|---|
| | 1 | 2 | 3 | 4 | 5 | 6 |
| $H_2S$ (%) | 0 | 0.54 | 1.07 | 2.7 | 2.0 | 1.84 |
| $C_4H_4S$ (%) | 0 | 0 | 0.64 | 0.01 | 0.19 | 0.44 |
| $C_5H_5S$ (%) | 0 | 0.52 | 0.27 | 0.17 | 0 | 0.53 |
| $C_5H_5S$ (%) | 51 | 16 | 10 | 9 | 9 | 6.9 |
| $\Sigma C_xH_y$ (%) | 13.6 | 5 | 6 | 5 | 9 | 1.6 |
| Coke (%) | 9.6 | 12.6 | 10.7 | 10.0 | 12.9 | 10.7 |
| BTX (%) | 16.9 | 36.3 | 31 | 36.6 | 29 | 35.6 |

"$T_M$" is temperature of the reactor wall in the mixing zone;
"$T_R$" is the temperature of the reactor wall in the higher temperature reaction zone;
"P" is the pressure;
"$G_W$" is the flow rate for water
"$G_T$" is the flowrate for the bitumen (tar);
"$G_{O2}$" is the flowrate for oxygen;
"$t_M$" is the residence time in the mixing section;
"$t_R$" is the residence time in the reaction zone; and
"$t_H$" is the residence time in the outlet pipe;

It is important to note that the temperature of the fluid inside the reactor is more than the temperature of the reactor wall by approximately 50K. The approximate fluid temperatures are given in parenthesis.

The mass percentage of combustion products is normalized to the bitumen input decreased by the combusted bitumen. In addition, the mass percentage of carbon monoxide and carbon dioxide shows only the contained carbon quantity.

The difference in water mass flow at the reactor outlet compared to the inlet is $(H_2O)_f$. If this figure is negative, more water molecules dissociate in the reactor than are formed from bitumen combustion.

$R_s$ is a high boiling point oil fraction. The coke residue has an approximate formula $CH_{0.5}$.

The results clearly indicate that substantial quantities of lighter, more valuable, hydrocarbon compounds such as methane; ethane; benzene; toluene; and xylene may be produced efficiently, in good yield and with reduced coke formation, directly from heavy, low grade hydrocarbon feedstock such as bitumen using the two stage heating process of the present invention with internal combustion heating to raise the temperature between the two stages. The results show that a significant degree of hydrogenation has occurred due to dissociation of water molecules.

The results demonstrate that the maximum yield of valuable products from bitumen conversion occurs at a temperature in the range 925K to 1025K while the initial process of tar dissolution occurs at a temperature of no more than 775K. It has also been shown that conversion rates at 925K are rapid.

The process can be used to treat heavy hydrocarbon feedstocks to produce a natural gas substitute; BTX; liquid oil fractions; and a coke fraction. The capital and running costs are typically far less than for an equivalent process involving gasification and Fischer-Tropsch liquid hydrocarbon synthesis. In addition, oxygen consumption is typically much lower (only about 30 wt %) than for a conventional high temperature gasification.

It will be appreciated that the invention is not restricted to the details described above with reference to the preferred embodiments but that numerous modifications and variations can be made without departing from the spirit or scope of the invention as defined in the following claims.

The invention claimed is:

1. A process for converting heavy hydrocarbon feedstock into conversion products comprising lower molecular weight hydrocarbon compounds, said process comprising:

mixing heavy hydrocarbon feedstock and supercritical water ("SCW") to form a fluid reaction mixture at a first temperature up to about 775K;

heating said fluid reaction mixture to a second temperature from about 870K to about 1075K;

maintaining said fluid reaction mixture at said second temperature for sufficient time to form a resultant fluid mixture containing said conversion products.

2. The process according to claim 1 wherein said fluid reaction mixture is heated internally from the first temperature to the second temperature.

3. The process according to claim 2 comprising feeding oxygen to said fluid reaction mixture to combust a portion of the combustible components of said fluid reaction mixture, thereby heating said fluid reaction mixture from the first temperature to the second temperature.

4. The process according to claim 1 wherein said fluid reaction mixture is heated from the first temperature to the second temperature in no more than 20 seconds.

5. The process according to claim 1 wherein said first temperature is from about 647K to about 775K.

6. The process according to claim 1 wherein the second temperature is from about 925K to about 1050K.

7. The process according to claim 1 wherein the process takes place at a pressure from more than the critical pressure of water to about 100 MPa (1000 bar).

8. The process according to claim 1 comprising feeding hydrogen to said fluid reaction mixture at the second temperature, wherein said hydrogen is produced in a reaction selected from gasification of residual hydrocarbon material and partial oxidation of solid carbonaceous material produced in the process.

9. The process according to claim 1 comprising heating pressurized water by indirect heat exchange against a fluid selected from the group consisting of said resultant fluid mixture and a fluid derived therefrom, to produce said SCW.

10. The process according to claim 9 wherein the pressurized water comprises recycled water separated from said resultant fluid and pumped to the required pressure.

11. The process according to claim 9 wherein the process generates excess heat, said process comprising heating water by indirect heat exchange against said fluid selected from the group consisting of said resultant fluid or said fluid derived therefrom, to produce steam.

12. The process according to claim 11 comprising pre-heating said feedstock by indirect heat exchange against at least a portion of said steam.

13. The process according to claim 11 wherein oxygen is fed to said fluid reaction mixture to combust a portion of the combustible components of said fluid reaction mixture, said process comprising pre-heating an oxygen-containing gas by indirect heat exchange against at least a portion of said steam.

14. The process according to claim 11 comprising using at least a portion of said steam to generate power in a steam turbine.

15. The process according to claim 1 wherein the process is carried out in a continuous flow reactor system, said process comprising operating said reactor system in a cycle, said cycle comprising an "on-line" phase in which said feedstock is converted into said conversion products; and an "off-line" phase in which solid carbonaceous material deposited within said reactor system is removed by combustion in a flow of SCW and oxygen.

* * * * *